(12) United States Patent
Suermondt et al.

(10) Patent No.: US 6,950,812 B2
(45) Date of Patent: Sep. 27, 2005

(54) DETERMINING ACCURACY OF A CLASSIFIER

(75) Inventors: Henri Jacques Suermondt, Sunnyvale, CA (US); Tom Elliott Fawcett, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 344 days.

(21) Appl. No.: 09/954,755

(22) Filed: Sep. 17, 2001

(65) Prior Publication Data

US 2003/0055801 A1 Mar. 20, 2003

(51) Int. Cl.$^7$ .......................... G06F 17/00; G06N 5/02
(52) U.S. Cl. ...................... 706/48; 706/45; 706/46
(58) Field of Search ........................... 706/48, 45, 46; 342/90

(56) References Cited

U.S. PATENT DOCUMENTS

| | | | | |
|---|---|---|---|---|
| 5,561,431 A | * | 10/1996 | Peele et al. | 342/90 |
| 6,212,532 B1 | * | 4/2001 | Johnson et al. | 715/500 |
| 6,306,087 B1 | * | 10/2001 | Barnhill et al. | 600/300 |

* cited by examiner

*Primary Examiner*—Joseph P. Hirl

(57) ABSTRACT

A method for determining accuracy of a classifier which provides an indication of the degree of correctness of the classifier rather than a mere correct/incorrect indication. The accuracy of the classifier is determined by determining a set of categories of an arrangement of categories selected for an item by the classifier and determining a set of categories of the arrangement selected for the item by an authoritative classifier. An accuracy measure which indicates a degree of correctness of the classifier is then determined based on the categories selected by the classifier and the categories selected by the authoritative classifier.

14 Claims, 9 Drawing Sheets

DETERMINING ACCURACY OF A CLASSIFIER

BACKGROUND OF THE INVENTION

1. Field of Invention

The present invention pertains to the field of classifiers. More particularly, this invention relates to determining accuracy of a classifier.

2. Art Background

A classifier may be defined as an entity that associates an item with one or more of a set of categories. Typically, a classifier determines which categories with which to associate an item in response to attributes of the item. Examples of classifiers are numerous and include rule-based systems, neural networks, Bayesian probability systems, as well as human beings.

It is commonly desirable to determine the accuracy of a classifier. For example, the accuracy of a classifier may be used to improve the classifier or to compare the relative accuracy of different classifiers.

One prior method for determining the accuracy of a classifier is to compare classifications rendered by the classifier with classifications rendered by an expert. Such a method usually yields a boolean correct/incorrect indication of accuracy with respect to the classification of individual items. The boolean indications may be aggregated to obtain a measure of the accuracy of the classifier. Unfortunately, such correct/incorrect indications are usually of relatively limited utility in evaluating the relative performance of a classifier. Moreover, such indications usually do not provide information on the extent to which an individual classification is wrong.

SUMMARY OF THE INVENTION

A method for determining accuracy of a classifier is disclosed which provides an indication of the degree of correctness of the classifier rather than a mere correct/incorrect indication. The accuracy of the classifier is determined by determining a set of categories of an arrangement of categories selected for an item by the classifier and determining a set of categories of the arrangement selected for the item by an authoritative classifier. An accuracy measure which indicates a degree of correctness of the classifier is then determined based on the categories selected by the classifier and the categories selected by the authoritative classifier.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
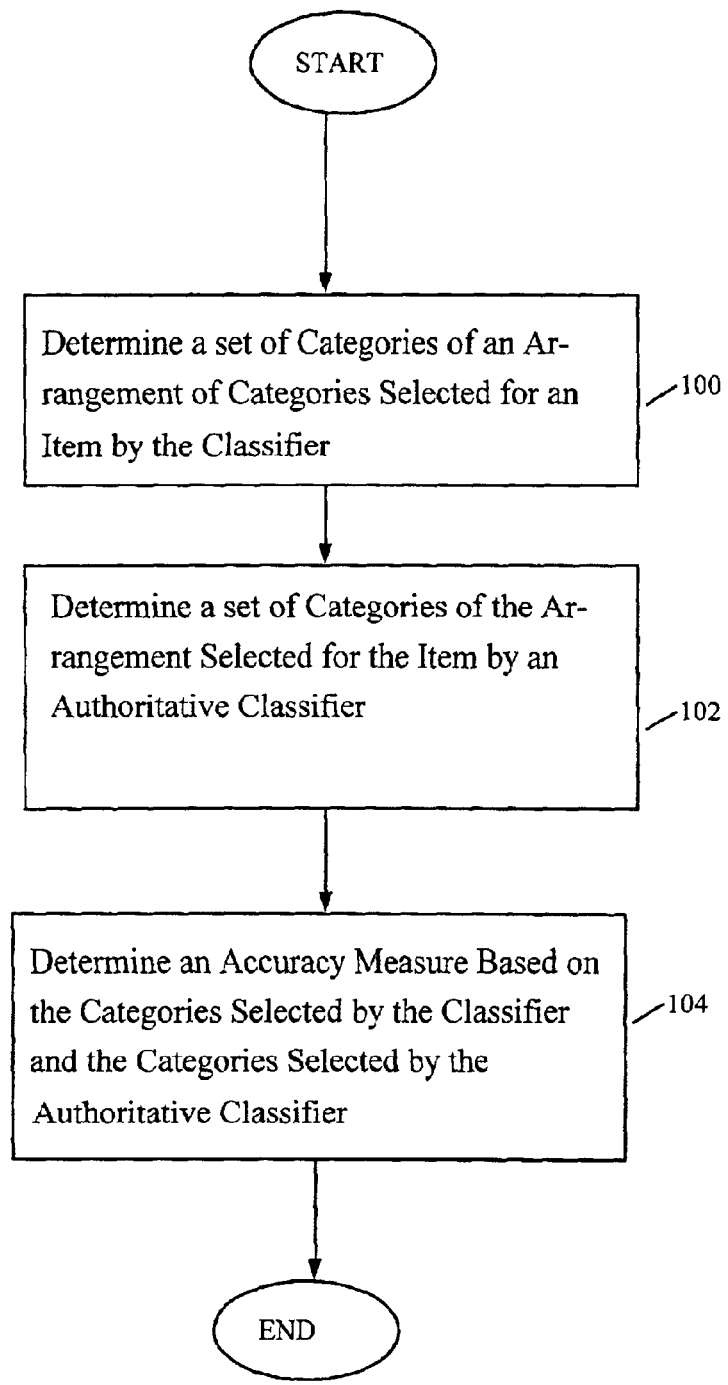
FIG. 1 shows a method for determining an accuracy of a classifier according to the present teachings.

FIG. 1 shows a method for determining an accuracy of a classifier according to the present teachings. At step 100, a set of zero or more categories selected for an item by the classifier is determined. The categories are selected by the classifier from among an arrangement of possible categories into which the item may be placed. The arrangement of categories may be, for example, a hierarchy of categories.

At step 102, a set of one or more categories selected for the item by an authoritative classifier is determined. The categories are selected by the authoritative classifier from among the arrangement of possible categories. At step 104, an accuracy measure is determined based on the categories selected by the classifier and the categories selected by the authoritative classifier. The accuracy measure provides an indication of the accuracy of the classifier for the item.

Figure 2:
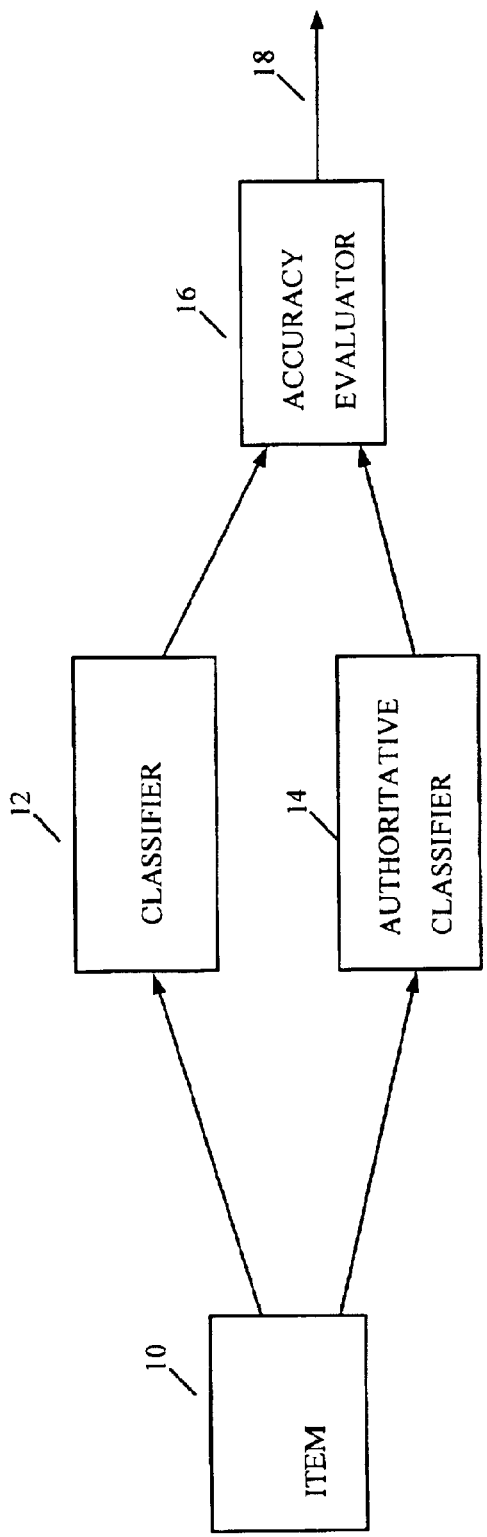
FIG. 2 shows an accuracy evaluator that determines an accuracy of a classifier according to the present teachings.

FIG. 2 shows an accuracy evaluator 16 that determines an accuracy 18 of a classifier 12 according to the present teachings. The accuracy 18 indicates the relative distance between the categories selected by the classifier 12 for an item 10 and the categories selected for the item 10 by an authoritative classifier 14.

The item 10 may be anything that may be classified. Examples include products, human beings, documents, natural elements, etc. The item 10 may be classified by the classifier 12 and the authoritative classifier 14 using one or more attributes of the item 10.

The classifier 12 may be any type of classifier examples of which include rule based systems including automated systems, neural networks, human experts, etc. The classifier 12 may classify items into zero or more classes or categories which may be organized in a hierarchy such that if an item is in a class it is also considered in the parent of that class.

The authoritative classifier 14 may be a human expert or a highly accurate automated classifier.

The accuracy evaluator 16 may be a human being or group of human beings or an automated system that performs the present methods.

Figure 3:
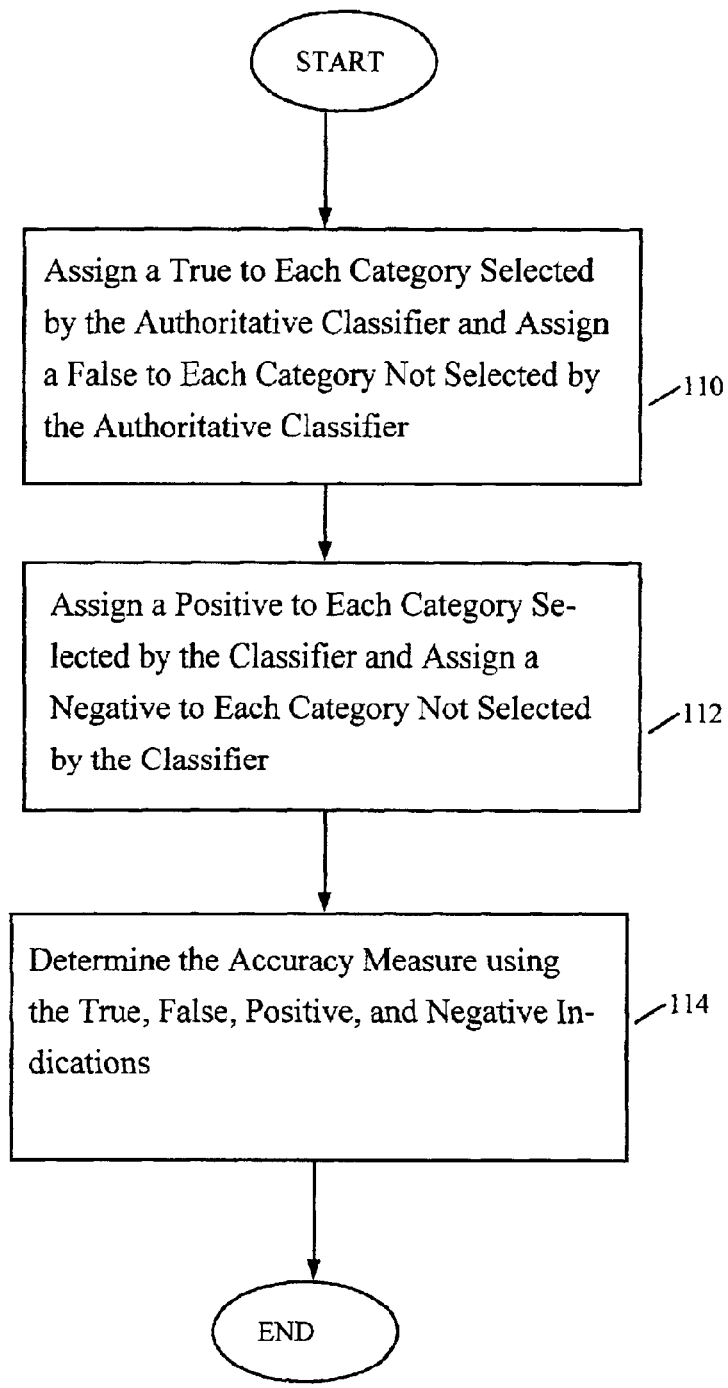
FIG. 3 shows a method for determining an accuracy measure based on the categories selected by a classifier and the categories selected by an authoritative classifier.

FIG. 3 shows a method for determining an accuracy measure based on the categories selected by the classifier 12 for the item 10 and the categories selected for the item 10 by an authoritative classifier 14. The method steps shown are performed by the accuracy evaluator 16 in response to the categories selected by the classifier 12 and the categories selected by the authoritative classifier 14.

At step 110, the accuracy evaluator 16 assigns a true indication to each category in the arrangement selected by the authoritative classifier 14 for the item 10 and assigns a false indication to each category in the arrangement not selected by the authoritative classifier 14 for the item 10. If a given category is selected by the authoritative classifier 14 for the item 10 then the given category and all of its ancestors are assigned the true indication at step 110.

At step 112, the accuracy evaluator 16 assigns a positive indication to each category in the arrangement selected by the classifier 12 for the item 10 and a negative indication to each category in the arrangement not selected by the classifier 12 for the item 10. If a given category is selected by the classifier 12 for the item 10 then the given category and all of its ancestors are assigned the positive indication at step 112.

At step 114, the accuracy 18 of the classifier, 12 is determined by combining the true, false, positive, and negative indications. The accuracy 18 may have a specified range such as between 0 and 1 or between 0 and 100, etc. For example, a higher value for the accuracy 18 indicates a relatively higher efficacy of the classifier 12 in classifying the item 10.

The accuracy 18 in one embodiment is based on a set of measures derived from the true, false, positive, and negative indications. The measures include a true positive count (TP), a false positive count (FP), and a false negative count (FN). The true positive count may be determined by counting the categories which are assigned the true and positive indications. The false positive count may be determined by counting the categories which are assigned the false and positive indications. The false negative count may be determined by counting the categories which are assigned the true and negative indications.

The measures derived from the true, false, positive, and negative indications may include a true negative count (TN). The true negative count may be determined by counting the categories which are assigned the false and negative indications.

One or more of the categories into which the item 10 may be classified may be assigned an indifferent indication (I) by the authoritative classifier 14. The categories with the indifferent indication do not contribute to the measures of accuracy. For example, the categories having an indifferent indication are not counted when determining the TP, FP, FN, or TN counts.

The accuracy 18 may be obtained by combining an over-conservativeness measure (OC) and an over-aggressiveness measure (OA). The over-conservativeness is the tendency of the classifier 12 to not put an item in enough classes or not put the item deep enough in the hierarchy given the attributes of the item. The over-aggressiveness is the tendency of the classifier 12 to put an item in more classes or in classes deeper in the hierarchy than is warranted by the attributes of the item.

In one embodiment, the over-conservativeness measure equals the FN/(TP+FN) and the over-agressiveness measure equals FP/(FP+TP). The over-conservativeness and over-aggressiveness measures may be averaged as follows to obtain the accuracy 18.

$$accuracy = 1 - \frac{OA + OC}{2}$$

The over-conservativeness and over-aggressiveness measures may be combined using a harmonic mean as follows.

$$accuracy = 1 - \frac{2}{\frac{1}{OA} + \frac{1}{OC}}$$

where accuracy=1 if OA=0 or OC=0.

Alternatively, the over-conservativeness and over-aggressiveness measures may be combined as follows.

accuracy=1−(α*OA+β*OC)

The coefficients α and β may be adjusted to adjust the relative importance of the over-aggressiveness and the over-conservativeness in determining the accuracy 18 of the classifier 12. In one embodiment, α+β=1.

The TP, FP, FN, TN, OA, OC, and/or combined accuracy measures may be aggregated over multiple test items to obtain a comprehensive measure of the accuracy of the classifier 12. The test items may be any subset of a predetermined test item set.

The accuracy 18 provides an indication of a degree of correctness in the classification rendered by the classifier 12 where the correctness is provided by the authoritative classifier 14. The accuracy 18 may be viewed as providing a measure of distance between the zero or more categories selected by the classifier 12 for the item 10 and the one or more categories selected by the authoritative classifier 14 for the item 10.

Accuracy values determined for different classifiers using the present teachings may be used to evaluate the relative efficacy of the classifiers. Similarly, accuracy values determined before and after changes in the classifier 12 may be used to evaluate the relative goodness or badness in the changes made to the classifier 12.

Figure 4:
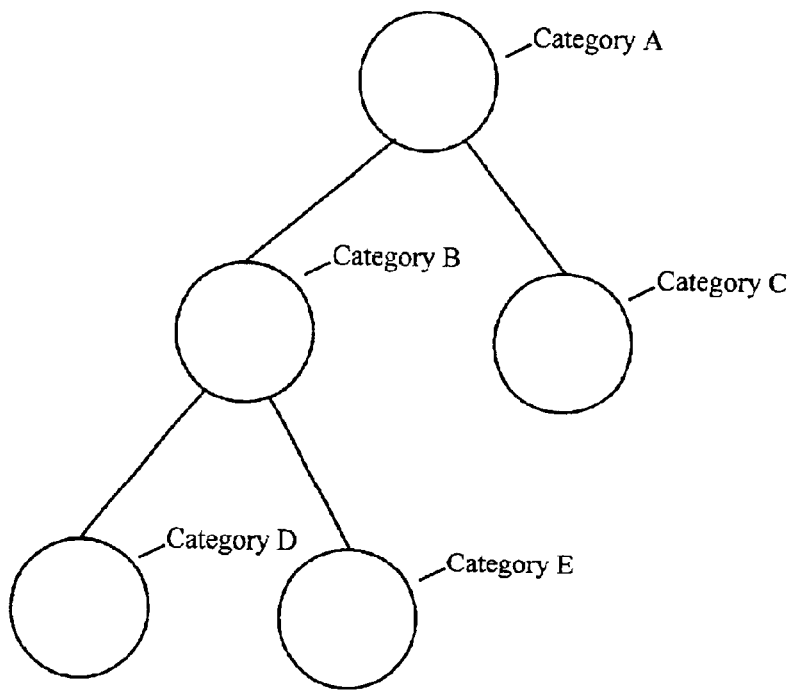
FIG. 4 shows an example arrangement of a set of categories A–E into which an item may be placed.

FIG. 4 shows an example arrangement of a set of categories A–E into which the item 10 may be placed. In this example, the categories A–E are arranged in a hierarchy. The categories B and C are children of the category A and the categories D and E are children of the category B. In other examples, the possible categories into which the item 10 may be placed may be discrete categories.

In the following example, the authoritative classifier 14 selects the category E for the item 10 whereas the classifier 12 selects the category D for the item 10.

Figure 5:
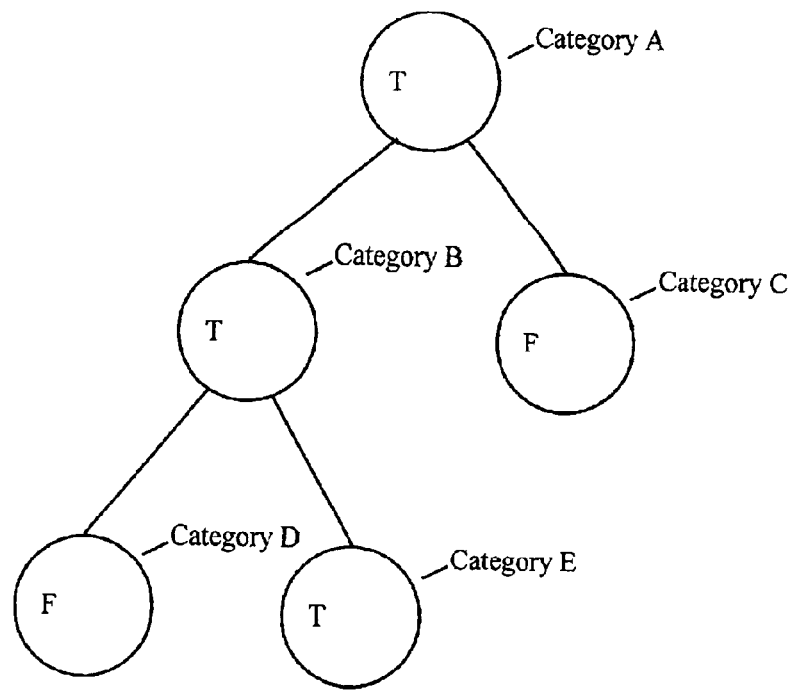
FIG. 5 shows the result of step 110 for the example categories A–E and an example classification rendered by an authoritative classifier.

FIG. 5 shows the result of step 110 for the example categories A–E and the example classification rendered by the authoritative classifier 14 which specifies category E. The category E is marked with the true indication (T) at step 110. In addition, all of the ancestors of category E, the categories A and B in this example, are marked with the true indication at step 110. The remaining categories C and D are marked with the false indication (F) at step 110.

In general, if a given category is an ancestor of multiple categories that are marked with the true indication then the given category is only marked once with the true indication.

Figure 6:
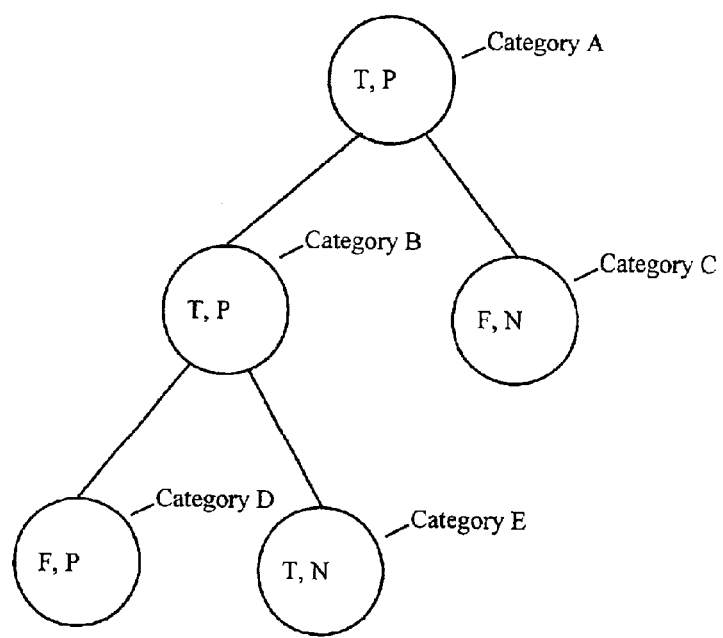
FIG. 6 shows the result of step 112 for the example categories A–E and an example classification rendered by a classifier.

FIG. 6 shows the result of step 112 for the example categories A–E and the example classification rendered by the classifier 12 which specifies the category D. The category D is marked with the positive indication (P) at step 112. In addition, all of the ancestors of category D, the categories B and A in this example, are marked with the positive indication at step 110. The remaining categories C and E are marked with the negative indication (N) at step 112.

In general, if a given category is an ancestor of multiple categories that are marked with the positive indication then the given category is only marked once with the positive indication.

In the example shown in FIG. 6, TP=2 (categories A and B), FP=1 (category D), TN=1 (category C), FN=1 (category E), OC=⅓, and OA=⅓.

Figure 7A:
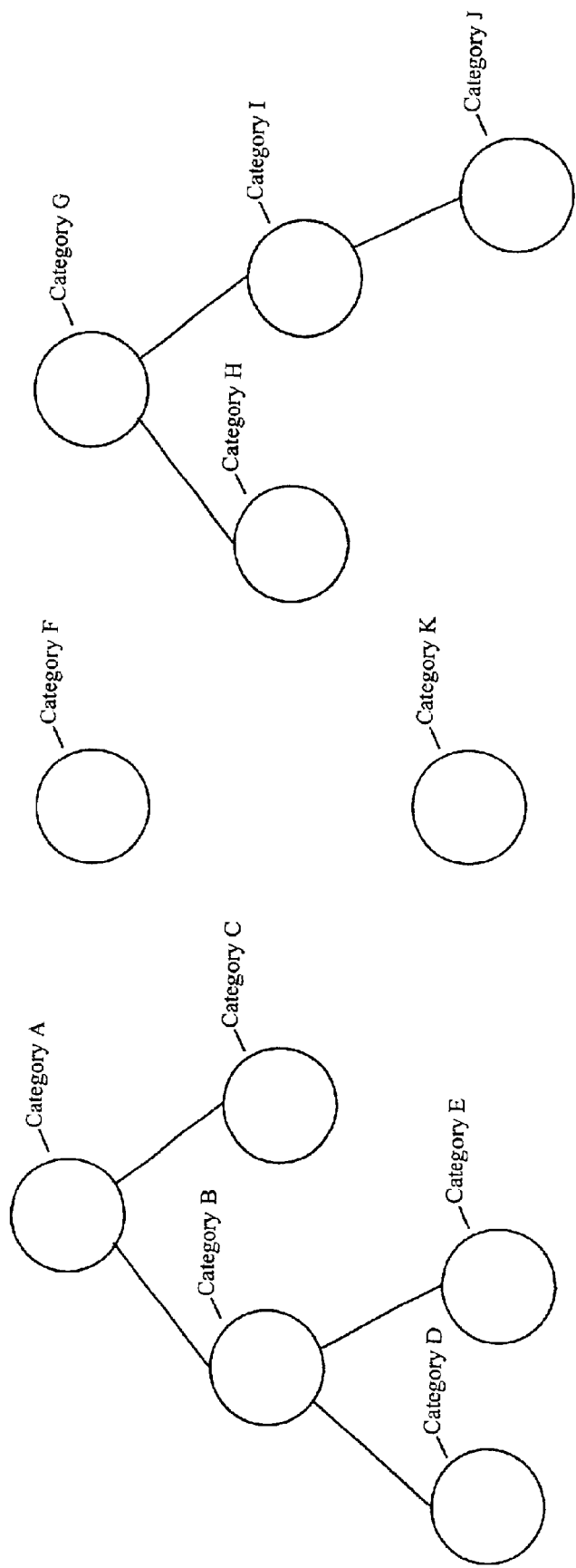
FIGS. 7a–7c show an example arrangement of a set of categories A–K into which an item may be placed.

FIG. 7a shows an example arrangement of a set of categories A–K into which an item 10 may be placed. In this example, the categories A–K are arranged into a forest, i.e. a collection of trees (hierarchies). Two of these trees consist of singleton nodes (node F and node K). A singleton node is a special case of a very simple tree. The categories B and C are children of category A and the categories D and E are children of category B. The categories H and I are children of the category G, and the category J is a child of the category I.

In the following example, the authoritative classifier 14 selects the categories B, H, and K for the item 10 whereas the classifier 12 selects the categories A, F, H, and K for the item 10. Moreover, the authoritative classifier 14 specifies that it is indifferent about category F.

Figure 7B:
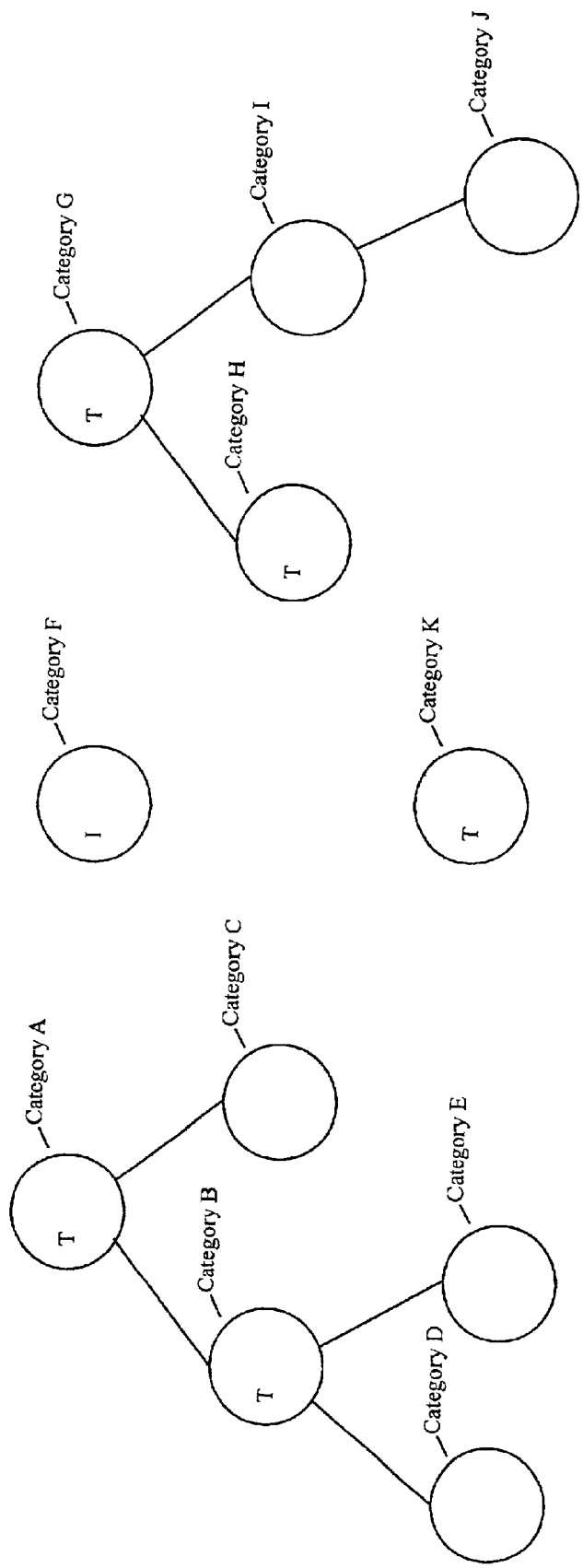

FIG. 7b shows the result of step 110 for the example categories A–K and the example classification rendered by the authoritative classifier 14 which specifies categories B, H, and K, and specifies indifferent for category F. The categories B, H, and K are marked with the true indication (T) at step 110. In addition, all of the ancestors of categories B, H, or K, the categories A and G in this example, are marked with the true indication at step 110. In addition, category F is marked with the indifferent indication (I) in a sub-step of step 110.

Figure 7C:
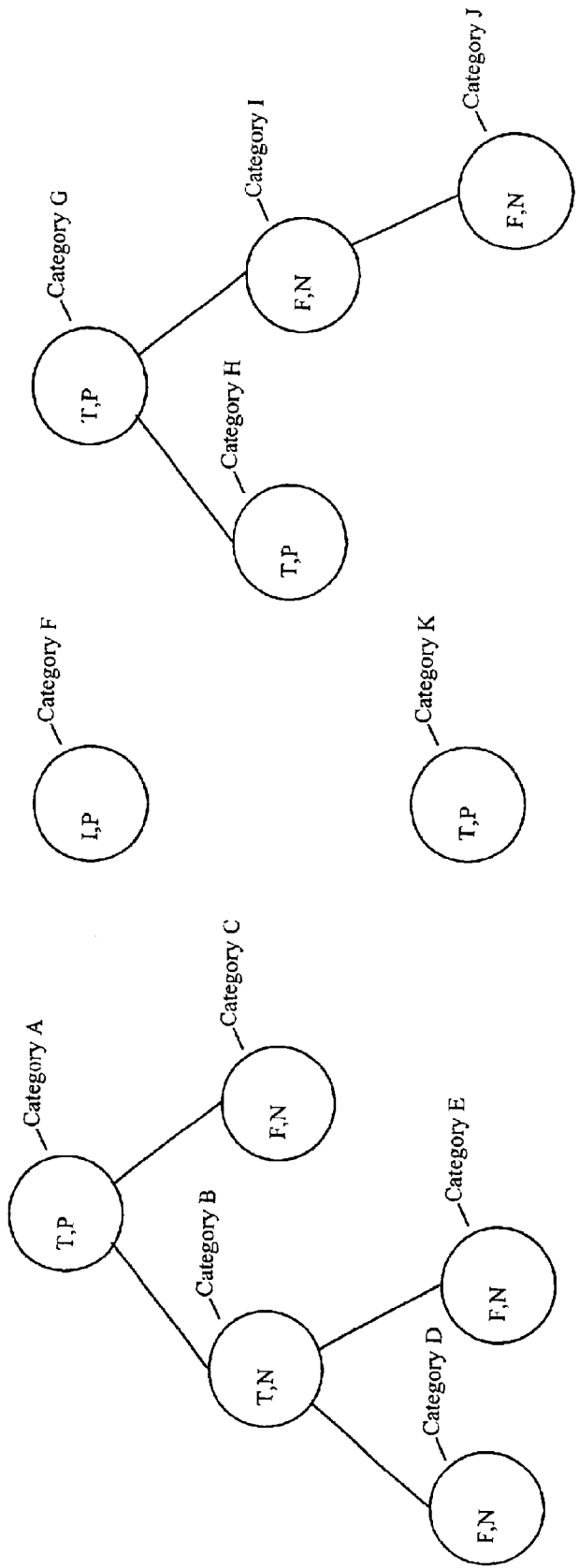

FIG. 7c shows the result of step 112 for the example categories A–K and the example classification rendered by the classifier 12 which specifies the categories A, F, H, and K. The categories A, F, H, and K are marked with the positive indication (P) at step 112. In addition, all the ancestors of categories A, F, H, or K, the category G in this example, are marked with the positive indication at step 110. The remaining categories are marked with the negative indication (N) at step 112.

In the example shown in FIG. 7c, TP=4 (categories A, G, H, K), FP=0 (as the category F is not counted because it was marked indifferent), TN=5 (categories C,D,E,I,J), and FN=1 (category B). Note that category B, which is marked negative (N) and true (T), is a "false negative" FN, as the classifier 12 incorrectly classified it as negative. In this example, OC=1/(4+1)=0.2 and OA=0/(0+4)=0. If the accuracy definition that uses the average of OC and OA is applied, accuracy=1−(0.2+0)/2=0.9. If the harmonic mean definition is applied, accuracy=1 (because OA=0).

Figure 8:
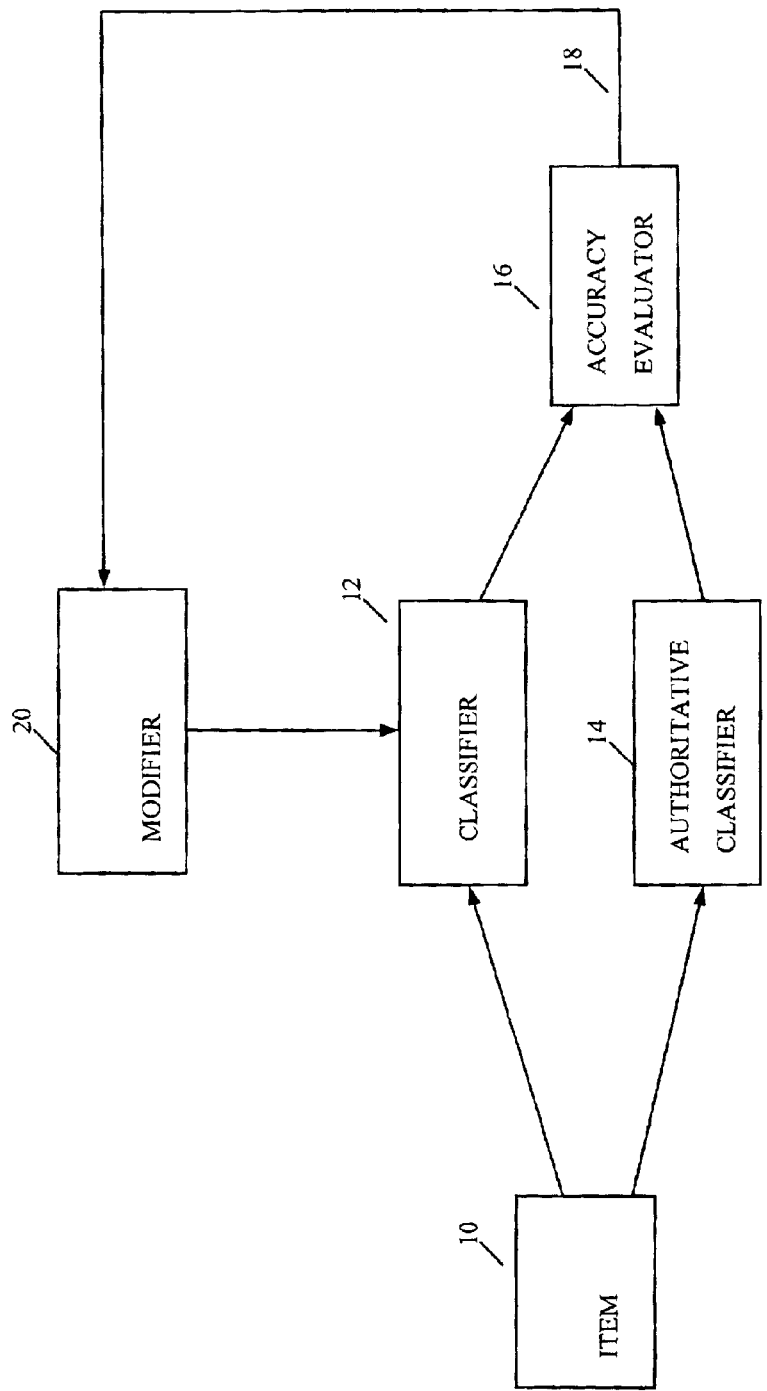
FIG. 8 illustrates the training of a classifier in response to an accuracy determined according to the present teachings.

FIG. 8 illustrates the training of the classifier 12 in response to the accuracy 18 according to the present teachings. The accuracy 18 is provided to a modifier 20. The accuracy 18 may be provided to the modifier 20 in the raw form of the TP, FP, FN, and TN counts or may be in a combined form.

The modifier 20 determines an alteration to be applied to the classifier 12 in response to the accuracy 18. The type of alteration applied to the classifier 12 depends on the nature of the classifier 12. For example, if the classifier 12 is a rule-based system then the alteration may be an alteration to one or more of its rules. If, for example, the classifier 12 is a neural network then the alteration may be an alteration to neural network weights.

The training of the classifier 12 may be an iterative process in which an alteration is applied to the classifier 12 in response to the accuracy 18 for a test item and then in response to the accuracy 18 obtained for a next test item, etc.

The accuracy 18 may be used as a fitness measure for designing the classifier 12 using genetic programming techniques.

The present techniques for determining the accuracy of a classifier may be used to analyze the purchasing behavior of individuals. For example, the authoritative classifier 14 may correspond to the actual purchasing behavior of a customer and the classifier 12 may correspond to the predicted purchasing behavior according to a model or profiling engine. The accuracy measure 18 may be used to improve the model and/or evaluate the model.

The present techniques for determining the accuracy of a classifier may be used to compare the performance of multiple categorization tools which may be provided, for example, by competing vendors.

The present techniques for determining the accuracy of a classifier may be used in an information management system such as a content, knowledge, or document management system. For example, the present techniques may be used to evaluate and/or improve the categorization of items in a content, knowledge, or document management system.

The present techniques for determining the accuracy of a classifier may be used to evaluate and/or improve the placement of items in electronic portals—for example, web site links or descriptions of documents.

The present techniques may be applied to the categorization of products, goods, or services.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A computer implemented method for determining accuracy of a classifier that classified an item in a hierarchy of categories, the method comprising:

assigning a first indication to each category in the hierarchy to which the item actually belongs;

assigning a second indication to each category in the hierarchy to which the item actually does not belong;

assigning a third indication to each category in the hierarchy that the classifier selected for the item;

assigning a fourth indication to each category in the hierarchy that the classifier did not select for the item; and evaluating the first, second, third, and fourth indications to determine an accuracy of the classifier that classified the item in the hierarchy of categories.

2. The method of claim 1 wherein the accuracy provides an indication of a degree of correctness for the item.

3. The method of claim 1 wherein the accuracy provides a measure between a true classification of the item and classification of the item rendered by the classifier.

4. The method of claim 1 further comprising:

providing a numerical range to indicate accuracy of the classifier;

combining the first, second, third, and fourth indications to determine a numerical value within the numerical range to indicate the accuracy of the classifier.

5. The method of claim 1 further comprising:

assigning the first indication to all ancestors of a category that are assigned a first indication.

6. The method of claim 1 wherein evaluating the first, second, third, and fourth indications further comprises counting the first, second, third, and fourth indications.

7. The method of claim 1 further comprising:

assigning an indifferent indication to each category in the hierarchy that does not contribute to a measure of accuracy of the classifier.

8. The method of claim 1 wherein evaluating the first, second, third, and fourth indications further comprises:

determining a first measurement of the classifier to put the item in more categories than the item actually belongs;

determining a second measurement of the classifier to put the item in less categories than the item actually belongs.

9. The method of claim 8 further comprising:

averaging the first and second measurements to obtain the accuracy of the classifier.

10. The method of claim 8 further comprising:

combining the first and second measurements with a harmonic mean to obtain the accuracy of the classifier.

11. A computer implemented method, comprising:

assigning a first indication to each category in a hierarchy to which an item actually belongs;

assigning a second indication to each category in the hierarchy to which the item actually does not belong;

classifying, with a classifier, the item in categories in the hierarchy;

assigning a third indication to each category in the hierarchy that the classifier selected for the item;

assigning a fourth indication to each category in the hierarchy that the classifier did not select for the item; and combining the first, second, third, and fourth indications to determine a degree of correctness rendered by the classifier in classifying the item in the hierarchy.

12. The method of claim 11 further comprising:

assigning the first indication as being true;

assigning the second indication as being false;

assigning the third indication as being positive;

assigning the fourth indication as being negative.

13. The method of claim 11 further comprising:

assigning the first indication to each category in the hierarchy to which a second item actually belongs;

assigning the second indication to each category in the hierarchy to which the second item actually does not belong;

classifying, with the classifier, the second item in categories in the hierarchy;

assigning the third indication to each category in the hierarchy that the classifier selected for the second item;

assigning the fourth indication to each category in the hierarchy that the classifier did not select for the second item; and combining the first, second, third, and fourth indications for the item with the first, second, third, and fourth indications for the second item to determine a measure of accuracy of the classifier in classifying items in the hierarchy.

14. A computer implemented method, comprising:

assigning a true indication to at least a first category in a hierarchy to which an item actually belongs;

assigning a false indication to at least a second category in the hierarchy to which the item actually does not belong;

classifying, with a classifier, the item in the first category to obtain a first indication;

classifying, with the classifier, the item in the second category to obtain a second indication; and comparing the true and false indications with the first and second indications to determine a degree of correctness rendered by the classifier in classifying the item in the hierarchy.

* * * * *